Feb. 20, 1934. T. BOOTH 1,948,199
ANIMAL TRAP
Filed Jan. 12, 1932
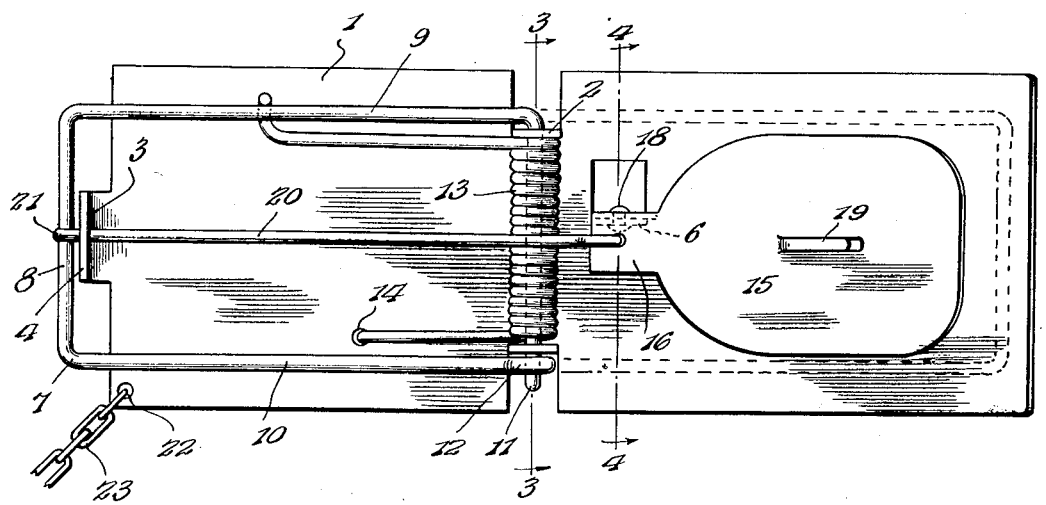
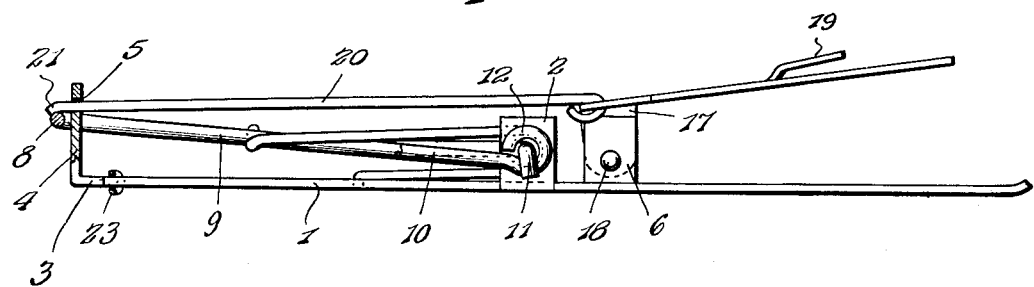
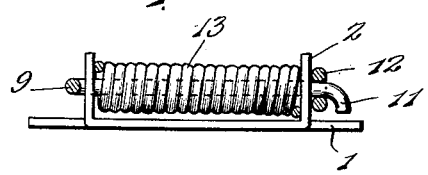
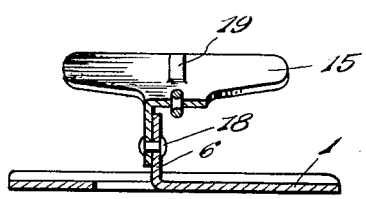
Inventor
T. Booth.
By Lacey & Lacey,
Attorneys Patented Feb. 20, 1934

1,948,199

UNITED STATES PATENT OFFICE 1,948,199

ANIMAL TRAP

Thomas Booth, Boise, Idaho

Application January 12, 1932. Serial No. 586,190

1 Claim. (Cl. 43—81)

This invention relates to an improved animal trap.

One object of the invention is to provide a device of this character wherein the usual trigger is dispensed with so that dislodgement of an animal from the trap, which dislodgement might otherwise be caused by the swinging upwardly of such a trigger, will be prevented.

Another object of the invention is to provide a trap having a jaw controlling rod which may be engaged with the jaw in such a manner that a predetermined amount of pressure will be required to release the jaw.

A further object of the invention is to provide a trap having a base which is formed from a single piece of sheet metal.

A still further object of the invention is to provide a trap wherein the bait pan will cover a relatively large portion of one end of the base so that an animal seeking the bait must engage some portion of the pan in order to reach the bait.

In the drawing,

Figure 1 is a top plan view of the device in set position,

Figure 2 is a side elevation of the device in a set position,

Figure 3 is a transversed sectional view on the line 3—3 of Figure 1 looking in the direction indicated by the arrows, and Figure 4 is a transversed sectional view on the line 4—4 of Figure 1 looking in the direction indicated by the arrows.

Referring now more particularly to the drawing the numeral 1 indicates a base plate which is preferably rectangular in shape and is stamped from sheet metal. The base plate is of sufficient thickness, of course, so that it may not be easily bent. Struck up from the base plate 1 at points intermediate of its length are oppositely disposed lugs 2. Formed on the base plate 1 at one end thereof and medially of its width is a tongue 3 which is bent upwardly throughout the major portion of its length to provide a lug 4 which is provided with an aperture 5. Struck up from the base plate 1 medially of the width thereof and in spaced relation to the lugs 2 is a lug 6.

Swingingly connected with the lugs 2 is a jaw 7 which is preferably formed from a single piece of heavy wire and comprises a bight portion 8 and arms 9 and 10. As best seen in Figure 1 of the drawings, the jaw 7 is substantially rectangular in shape and the arm 9 is extended and bent at right angles to extend through the lugs 2, and is bent downwardly at its free end as indicated by the numeral 11. The free end portion of the arm 10 is provided with an eye 12 which receives the down turned end portion 11. The eye 12 and the end portion 11 provides connecting means for the ends of the wire comprising the jaw. Normally surrounding the end portion of the arm 9 which is disposed between the lugs 2 is a heavy wire coil spring 13 having one end portion engaging in an opening 14 formed in the base plate, and the other end portion bent to engage under the arm 9 of the jaw 7. Swingingly connected with the lug 6 is a bait pan 15 which is of oblong shape and is relatively large so that it will cover the major portion of one end of the base plate 1. The bait pan is provided at one end with a tongue 16 which is provided with a depending portion 17. Extending through the depending portion 17 and the lug 6 is a rivet 18 which swingingly connects the bait pan and the lug 6. Struck up from the bait pan 15 medially thereof is a bait engaging hook 19 which is, of course, adapted to receive any suitable bait which it is desired to use for catching an animal. Swingingly connected with the tongue 16 at the forward end thereof is a jaw controlling rod 20 which extends longitudinally of the base plate 1 in spaced relation thereto and has its free end portion extending through the aperture 5 in the lug 4. As best seen in Figure 2 of the drawing, the outer end of the jaw controlling rod 20 is provided with a down turned portion 21 which is adapted to engage the bight 8 of the jaw 7 when the trap is in set position. Attention is directed to the fact that the jaw controlling rod is connected to the tongue 16 at a point forwardly of the vertical plane of the rivet connection so that when the bait pan 15 is depressed, as it would be when the weight of an animal was brought to bear upon its upper surface, the jaw controlling rod will be retracted and the down turned end portion 21 will likewise be retracted for freeing the bight portion 8 and releasing the jaw.

Formed in the base plate 1 at one corner thereof is an opening 22, and normally engaged in said opening is a link of a chain 23. The chain is employed for the purpose of anchoring the trap in a given position, or within a given area, so that the struggling animal caught in the trap will not be permitted to drag the trap away. It is, of course, understood that any type of securing means may be employed in lieu of a chain, if desired.

In use the bait pan is first baited. The jaw 7 is then swung against the tension of the spring 13 until the arms thereof lie against the base plate 1 and the bight portion 8 thereof is disposed in close spaced relation to the upstanding tongue 3 of the lug 4 and beneath the aperture 5. The bait pan is then lifted and the jaw controlling rod 20 is projected so that the down turned portion 21 will overlie the bight 8 of the jaw. The trap is then placed in any desired location. When an animal senses the presence of the bait he will instinctively seek the bait and when he places his body or a portion thereof on the bait pan in an effort to reach the bait held by the hook 19, his weight will depress the bait pan, and retract the jaw controlling rod 20 and the down turned portion 21 and release the jaw. The jaw will, of course, be caused to swing by the spring 13 and will contact the animal and crush him between the jaw and the bait pan and base plate.

Attention is directed to the fact that inasmuch as I have provided the jaw controlling rod with a down turned portion 21 the bait pan will afford greater resistance to the pressure of an animal bearing thereagainst. Thus it will be seen that animals of very light weight will not release the trap. The reason for this construction is that it is not my desire to kill half grown animals. The reason for this is quite obvious, that is to say, that half grown animals will not be of as much value as the animals of greater age and size. It is to be understood that I can pre-determine the amount of pressure required to set off the trap by bending either upwardly or downwardly the down turned end portion 21.

I claim:

A device of the class described including a base plate cut to define upwardly disposed ears medially of its length and having a tongue projecting past one end of said base plate and being bent upwardly to form a lug having an aperture, a jaw swingingly connected to the ears, a spring carried by the jaw, a bait pan swingingly connected with the base plate, and a jaw-controlling rod extending longitudinally of the jaw above the spring and having an end extending through the aperture, said jaw extending past the end of the base plate and having a bight portion engageable beneath the end of the rod, said end of the rod being adapted for bending downwardly on the bight portion for predetermining the pressure required to swing the bait pan and retract the rod for releasing the jaw.

THOMAS BOOTH.